A. W. HARP.
ORE BELT EDGER.
APPLICATION FILED DEC. 14, 1912.

1,126,456.

Patented Jan. 26, 1915.

2 SHEETS—SHEET 1.

Witnesses:
Charles Pickles
Thos. Castberg

Inventor:
Albert W. Harp,
By J. H. Strung, atty

A. W. HARP.
ORE BELT EDGER.
APPLICATION FILED DEC. 14, 1912.
1,126,456.
Patented Jan. 26, 1915.
2 SHEETS—SHEET 2.
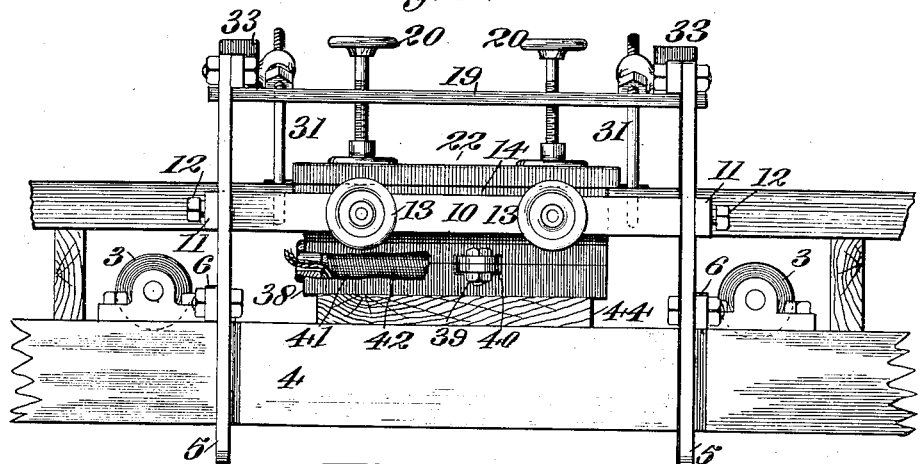
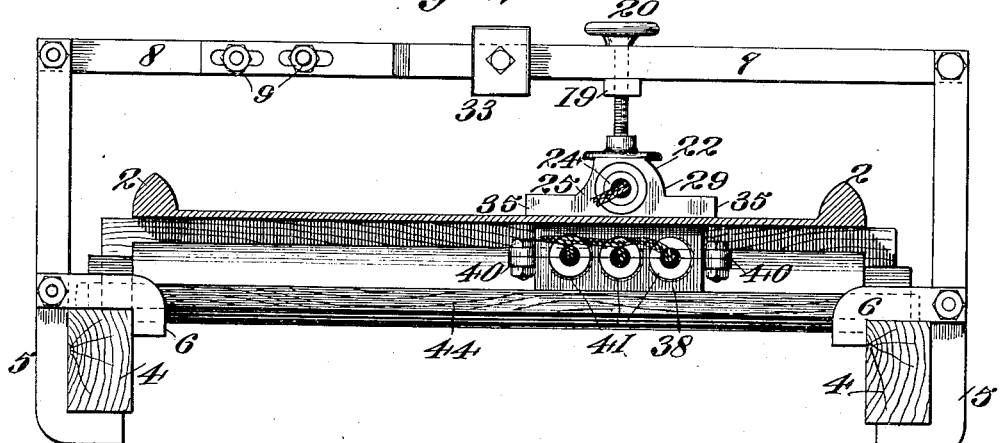
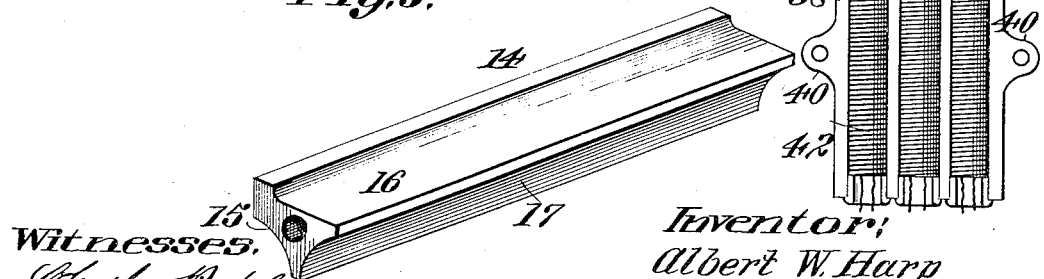
Witnesses:
Charles Pickles
Thos. Castberg
Inventor:
Albert W. Harp
By G. H. Strong, Atty.

UNITED STATES PATENT OFFICE.

ALBERT W. HARP, OF ANGELS CAMP, CALIFORNIA.

ORE-BELT EDGER.

1,126,456.

Specification of Letters Patent.

Patented Jan. 26, 1915.

Application filed December 14, 1912. Serial No. 736,773.

*To all whom it may concern:*

Be it known that I, ALBERT W. HARP, a citizen of the United States, residing at Angels Camp, in the county of Calaveras and State of California, have invented new and useful Improvements in Ore-Belt Edgers, of which the following is a specification.

This invention relates to vulcanizers and especially to vulcanizers for repairing and splicing the body or edges of conveyer belts.

Conveyer belts, particularly those used for carrying ore, frequently become worn or cut on their carrying surface and become damaged at their edges, causing the ore to spill out and allowing grit to get into the bearings of the belt supporting rollers and badly damage them.

The object of the present invention is the provision of a simple and comparatively inexpensive device, adapted for use with steam, gasolene, or electricity, which can be readily applied to any of the ordinary types of conveyer belts; and, regardless of size and configuration of the edges, be quickly operated to splice and repair the belt so that it will be practically as good as new, without necessitating the removal of the belt from its ordinary position.

The invention consists of the parts and the construction and combination of parts, as hereinafter more fully described and claimed, having reference to the accompanying drawings, in which—

Figure 1:
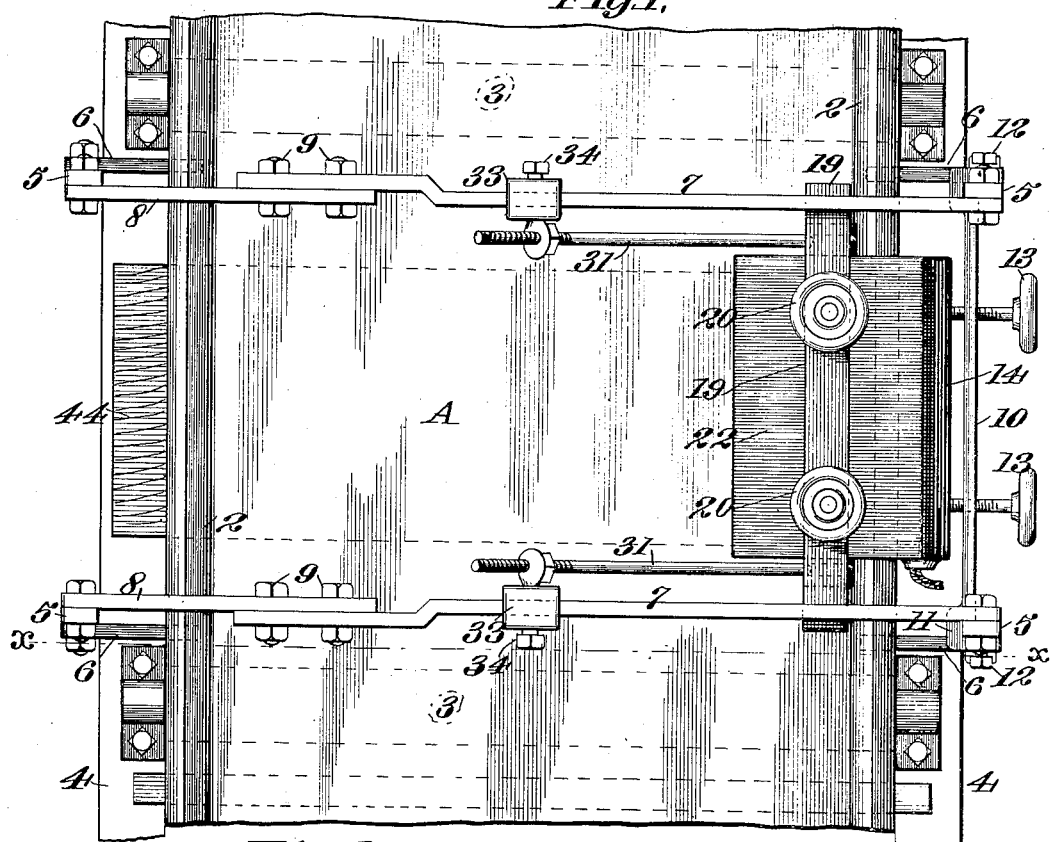
Figure 2:
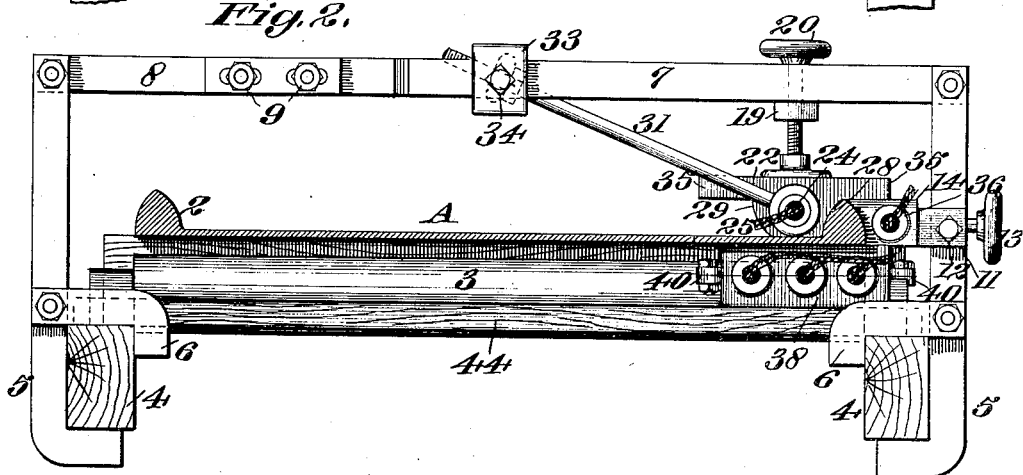

Figure 1 is a plan view showing the device applied to a conveyer belt, whose edge is to be repaired. Fig. 2 is a cross-section on line X—X, Fig. 1. Fig. 3 is an end elevation of the apparatus in position for use as an edger, as in Figs. 1 and 2; the lower heating unit being broken away to show a heating coil. Fig. 4 is an elevation similar to Fig. 1, showing the belt in cross-section and the invention used to splice or repair the body of the belt. Fig. 5 is a perspective of a combination edger. Fig. 6 is a plan in partial section of the underneath heating element.

The ore or other conveyer belt which is to be repaired is shown at A and has the edges 2. Belts of this character have the edges 2 of different configuration, there being a number of ore conveyer belts of different forms on the market at the present time. The present invention is adapted for use on any conveyer belt regardless of the configuration of the edges.

In repairing a conveyer belt with my invention, rubber cement, together with the same kind of material of which the conveyer belt is constructed, is used, as some conveyer belts are made of rubber and fabric, while others are made of canvas only.

The rollers which support the conveyer belt are shown at 3, and are carried by the wooden sills 4 of the machine frame. Adapted to engage with the underside of the sills 4 are adjustable, angular arms 5, with pivoted latches 6 adapted to hook over the top of the sills; and these arms connect with crossbars formed of two parts 7—8 which are adjustably connected by bolts and nuts 9, so that the arms 5 which engage the sills may be moved toward and away from each other according to the distance the stringers are apart, thereby adapting the device to any width of conveyer belt. These crossbars are braced by side bars 10 which have clamps 11 at their ends that embrace the arms 5 and are vertically adjustable thereon, and are secured thereto by screws 12.

The bars 10 carry screws 13 which act, when the device is used to splice or repair the edges of the belt, to bear against and adjustably hold in position the combination adjustable outside edger 14, which is shown in detail in Fig. 5. This edger has faces 15—16—17 of different configuration covering a wide range of contours existing on the outer edges of conveyer belts now on the market, so that the invention is adapted for use in connection with any commercial belt. The screws 13 hold the edger 14 snugly against the outer face of the belt edge, as shown in Fig. 2.

Extending under, and braced against, the crossbars 7—8 is a bar 19 which has screws 20 adapted to bear upon the combination, reversible, inner edger and splicer 22. The splicer has a hole into which fits a standard electric heating coil 24 having terminals 25 for connection to any electric circuit whose voltage is sufficient to effect the proper temperature suitable for splicing.

The splicer 22 constitutes, as shown in Fig. 2, an inner edger which has opposite faces 28—29 of different configuration, so that it is adapted to fit the edge of any of the ordinary conveyer belts. This inner edge is pivotally connected with rods 31 carried on clamps 33 which are adjustable on the crossbar 7, and may be secured thereto at any desired point by screws 34, thus rendering it possible for the edger 22 to be moved crosswise of the belt, so that it will fit snugly against the edge of the conveyer belt, no matter what the width of the latter may be. The inner edger 22 has flanges 35 which are adapted to overlap the outside edger 14 and thus rigidly clamp the edge 2.

The purpose of the screws 20 is to evenly transmit pressure to the edge of the belt through the splicer 22 and edgers. The adjustable clamps 33 and the screws 13 enable the respective edgers to be shifted to any desired position so that they will always properly contact with the edge of the belt.

The outside edger 14 has a longitudinal pocket or hole to receive a heating coil 36, similar to the coil 24 of the inner edger 22. Operating in conjunction with the combined edgers and heating units 22—24 is an underneath heating unit 38 which is preferably made in two parts, suitably held together, as by the bolts 39, passing through lugs 40 on the sides of the section. This heating unit has apertures 41, Fig. 6, adapted to contain heating units 42; and the apertures are interconnected, as shown at 43, Fig. 6, so that if a gasolene torch or steam coil is desired to be substituted for the electrical heating coils 42, the heat may readily pass from one chamber to another, and thus heat the entire splicer uniformly.

In practice, when the belt needs repairing, either at the edge or on its body, the machine is stopped, the belt lifted and a plank, represented at 44, is shoved under the belt and allowed to rest on the sills 4; the purpose of the plank being to support the heater 38. The hanger represented by the arms 5 and crossbars 7—8 is suitably adjusted to the frame in accordance with the width of the belt. If an edge of the belt is to be repaired, then the parts are adjusted as shown in Fig. 2; the outside edger 14 being supported against the outside edge of the belt and on the edge of the underneath heater 38 which projects beyond the belt and suitably held in place by the bar 10 and adjusting screws 13. Next, the inside edger 22 is shoved up against the inside edge of the belt and held snug against the belt edge by means of the rods 31 and clamps 33, the belt having been previously prepared for the vulcanizing operation; the several heating units 22—14—38 are heated to the proper temperature and for a sufficient length of time to conclude the job.

If the body of the belt is to be prepared or vulcanized, the parts are arranged, as shown in Fig. 4, in which only the two heaters 22 and 38 are used; the heater 22 being reversed so as to bring its broad, flat side with the flanges 35 down on the belt. Sufficient pressure is applied from above on the heater 22, when used either as an edger, as in Fig. 2, or otherwise, as shown in Fig. 4, by means of clamp screws 20.

Having thus described my invention, what I claim and desire to secure by Letters Patent is—

1. A vulcanizing outfit for conveyer belts, comprising a frame extending crosswise over the belt and having means to grip the frame on which said belt travels, at the two sides of the belt, a vulcanizing element with heating means supported from beneath the belt and on which the belt rests, and a vulcanizing element with heating means on top the belt and held down thereon in opposition to the underneath vulcanizing element by means carried by said frame.

2. A vulcanizing outfit for conveyer belts having raised edges, consisting of a crossbar gripping the underside of the belt supporting frame and extending above and across the belt and adjustable lengthwise of the frame, a vulcanizing element with heating means on top the belt adjustably connected with the crossbar, a second vulcanizer coöperating with the first mentioned vulcanizer for supporting the underside of the belt in opposition to the vulcanizer, and a coöperating outside edge between and supported partly by the two vulcanizers mentioned and partly by said crossbar.

3. In a belt splicer, the combination with means for supporting the belt, of a frame, an outside edger attached to said frame and adjustable to different heights thereon, and a bottom heater adapted to coöperate with the edge of the belt.

4. In a belt conveyer edger and splicer, the combination with means for supporting the belt conveyer, of a frame, an outside edger adjustably attached to said frame, and an inside heater adapted to coöperate with the edge of the belt conveyer, said heater being adjustable in relation to the means for supporting the belt conveyer.

5. In a belt edger and splicer, the combination with means for supporting the belt, of a separate vulcanizing attachment having independent outside and inside adjustable edgers, and heating means carried by said edgers.

6. In a belt conveyer edger and splicer, the combination with a supporting frame, of an outside edger carried thereby, clamps for securing the outside edger at different heights on the frame, and means for adjusting said edger laterally.

7. In a belt conveyer edger and splicer, the combination with a supporting frame, of a reversible inside edger carried thereby, and means for adjusting said edger laterally and vertically as may be desired.

8. In a belt conveyer edger and splicer, the combination with a supporting frame, of a vertically and laterally adjustable inside edger having edging faces of different contours and adaptable for arrangement to enable the use of any of them, and splicing faces of different widths.

9. In a belt splicer, the combination with a supporting frame, of a self heated outside edger having edging faces of different contours and adaptable for arrangement to enable the use of any of them, and adjustable vertically and horizontally with relation to said supporting frame.

10. In a belt splicer, the combination with a supporting frame, of outside and inside edgers both arranged for adjustment to different heights and to different positions laterally and for contact with each other, and a bottom heater coöperating with said edgers.

11. In a belt splicer, the combination with a supporting frame, of overlapping outside and inside edgers, and means for evenly transmitting the pressure of the edgers to the edge of the belt conveyer.

12. In a belt splicer, the combination with a supporting frame having means for engaging the sills which support the belt conveyer, of outside and inside edgers adjustably carried by said frame and adapted to assume different positions, and heating devices for said edgers.

13. In a belt splicer, the combination with a supporting frame having an upright part adapted to engage a sill which supports the belt conveyer, and said frame having a substantially horizontal part, of an outside edger adjustably carried by the upright part of the frame, an inside edger adjustably carried by the substantially horizontal part of the frame, and means for heating said edgers.

14. In a belt splicer, the combination with an upper reversible vulcanizing element having faces of different areas, of an opposed underneath heater having a plurality of interconnected chambers, and a removable heat supplying element adapted for insertion in one or more of said chambers.

15. A vulcanizing outfit for conveyer belts having raised edges, consisting of an adjustable cross bar gripping the outside of the belt supporting frame and extending above and across the belt and adjustable lengthwise of the frame, a vertically and laterally adjustable element carried by the cross bar, and a second vulcanizing element coöperating with the first mentioned element for supporting the outside of the belt.

16. A vulcanizing outfit for conveyer belts having raised edges, consisting of a cross bar gripping the outside of the belt supporting frame and extending above and across the belt and adjustable lengthwise of the frame, and a plurality of adjustable vulcanizing elements carried thereby.

In testimony whereof I have hereunto set my hand in the presence of two subscribing witnesses.

ALBERT W. HARP.

Witnesses:
BEN CARLOW,
W. H. THOMPSON.